US008578064B2

(12) United States Patent
Whaley et al.

(10) Patent No.: US 8,578,064 B2

(45) Date of Patent: Nov. 5, 2013

(54) INTERCEPTION AND MANAGEMENT OF I/O OPERATIONS ON PORTABLE STORAGE DEVICES

(75) Inventors: John Whaley, San Mateo, CA (US); Thomas Joseph Purtell, II, Menlo Park, CA (US)

(73) Assignee: Moka5, Inc., Redwood City, CA (US)

(*) Notice: Subject to any disclaimer, the term of this patent is extended or adjusted under 35 U.S.C. 154(b) by 369 days.

(21) Appl. No.: 12/435,273

(22) Filed: May 4, 2009

(65) Prior Publication Data

US 2010/0042753 A1 Feb. 18, 2010

Related U.S. Application Data

(60) Provisional application No. 61/088,328, filed on Aug. 12, 2008.

(51) Int. Cl.
*G06F 3/00* (2006.01)
*G06F 5/00* (2006.01)

(52) U.S. Cl.
USPC .................................. 710/13; 710/29; 710/39

(58) Field of Classification Search
USPC ................................................ 710/13, 29, 39
See application file for complete search history.

(56) References Cited

U.S. PATENT DOCUMENTS

| | | | | |
|---|---|---|---|---|
| 7,373,451 | B2 | 5/2008 | Lam | |
| 7,398,349 | B2 * | 7/2008 | Birrell et al. | 711/103 |
| 2008/0005398 | A1 * | 1/2008 | Huffman | 710/39 |
| 2008/0010395 | A1 * | 1/2008 | Mylly et al. | 711/100 |
| 2009/0094447 | A1 * | 4/2009 | Yang et al. | 713/2 |
| 2009/0132816 | A1 * | 5/2009 | Lee | 713/164 |
| 2010/0037089 | A1 * | 2/2010 | Krishnan et al. | 714/5 |

FOREIGN PATENT DOCUMENTS

| | | | |
|---|---|---|---|
| WO | 2008005765 | A2 | 1/2008 |
| WO | 2008086317 | A2 | 7/2008 |

* cited by examiner

*Primary Examiner* — Idriss N Alrobaye
*Assistant Examiner* — Zachary K Huson
(74) *Attorney, Agent, or Firm* — Park, Vaughan, Fleming & Dowler LLP; Chia-Hsin Suen

(57) ABSTRACT

One embodiment provides a system that processes an input/output (I/O) operation associated with a portable storage device. During operation, the system loads a virtual computing environment stored on the portable storage device into a host computer system coupled to the portable storage device. Next, the system intercepts the I/O operation from the virtual computing environment to the portable storage device. Finally, the system decouples the I/O operation from the virtual computing environment by processing the I/O operation independently of a representation of the I/O operation in the virtual computing environment.

15 Claims, 8 Drawing Sheets

Start

Load virtual computing environment stored on portable storage device into host computer system coupled to portable storage device
502

Intercept I/O operation from virtual computing environment to portable storage device
504

Provide representation of I/O operation to virtual computing environment
506

Process I/O operation independently of representation to virtual computing environment
508

End

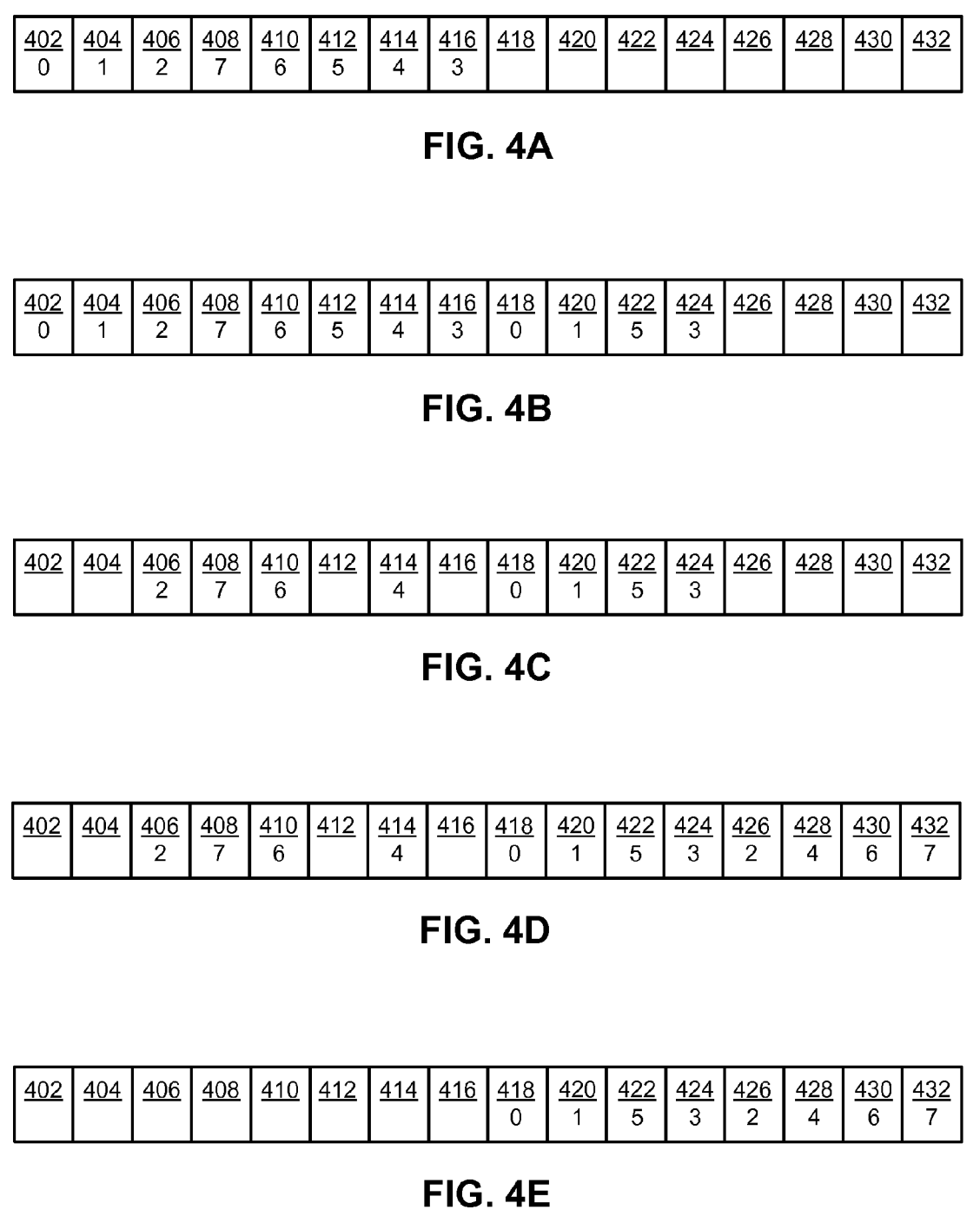

| 402 | 404 | 406 | 408 | 410 | 412 | 414 | 416 | 418 | 420 | 422 | 424 | 426 | 428 | 430 | 432 |
|---|---|---|---|---|---|---|---|---|---|---|---|---|---|---|---|
| 0 | 1 | 2 | 7 | 6 | 5 | 4 | 3 | | | | | | | | |

FIG. 4A

| 402 | 404 | 406 | 408 | 410 | 412 | 414 | 416 | 418 | 420 | 422 | 424 | 426 | 428 | 430 | 432 |
|---|---|---|---|---|---|---|---|---|---|---|---|---|---|---|---|
| 0 | 1 | 2 | 7 | 6 | 5 | 4 | 3 | 0 | 1 | 5 | 3 | | | | |

FIG. 4B

| 402 | 404 | 406 | 408 | 410 | 412 | 414 | 416 | 418 | 420 | 422 | 424 | 426 | 428 | 430 | 432 |
|---|---|---|---|---|---|---|---|---|---|---|---|---|---|---|---|
| | | 2 | 7 | 6 | | 4 | | 0 | 1 | 5 | 3 | | | | |

FIG. 4C

| 402 | 404 | 406 | 408 | 410 | 412 | 414 | 416 | 418 | 420 | 422 | 424 | 426 | 428 | 430 | 432 |
|---|---|---|---|---|---|---|---|---|---|---|---|---|---|---|---|
| | | 2 | 7 | 6 | | 4 | | 0 | 1 | 5 | 3 | 2 | 4 | 6 | 7 |

FIG. 4D

| 402 | 404 | 406 | 408 | 410 | 412 | 414 | 416 | 418 | 420 | 422 | 424 | 426 | 428 | 430 | 432 |
|---|---|---|---|---|---|---|---|---|---|---|---|---|---|---|---|
| | | | | | | | | 0 | 1 | 5 | 3 | 2 | 4 | 6 | 7 |

FIG. 4E

INTERCEPTION AND MANAGEMENT OF I/O OPERATIONS ON PORTABLE STORAGE DEVICES

RELATED APPLICATION

This application claims the benefit of U.S. Provisional Application No. 61/088,328, entitled "Gracefully Handling Sudden Disconnection of Storage Devices via IO Intercepts," by inventors John Whaley and T J Purtell II, filed 12 Aug. 2008.

The subject matter of this application is related to the subject matter in a co-pending non-provisional application by the same inventors as the instant application and filed on the same day as the instant application, entitled "Policy-Based Layered Filesystem Management," having Ser. No. 12/435,279, and filed on 4 May 2009.

The subject matter of this application is related to the subject matter in a co-pending non-provisional application by inventors John Whaley, Thomas Joseph Purtell II, and Jesse Ernest Gross IV and filed on the same day as the instant application, entitled "Transactional Virtual Disk with Differential Snapshots," having Ser. No. 12/435,302, and filed 4 May 2009.

BACKGROUND

1. Field

The present embodiments relate to techniques for managing input/output (I/O) operations on portable storage devices. More specifically, the present embodiments relate to a method and system for decoupling I/O operations from virtual computing environments associated with the portable storage devices to the portable storage devices.

2. Related Art

Portable storage devices are often used to store backups and/or copies of data from a user's primary computing device, such as a personal computer or a laptop computer. For example, a Universal Serial Bus (USB) flash drive may contain copies of important files (e.g., documents, music, photos, etc.) from a user's laptop computer. Furthermore, the compact, rewritable, durable, and affordable nature of portable storage devices may facilitate the storage and transfer of data between electronic computing devices. For example, data on a USB flash drive may be accessed from and/or copied to an electronic computing device (e.g., printer, computer, digital camera, etc.) simply by plugging the USB flash drive into a USB port on the electronic computing device.

Unfortunately, storage mechanisms on portable storage devices typically have a number of drawbacks. First, disconnection of a portable storage device from another electronic device without proper shutdown may corrupt the data on the portable storage device and render the data unusable. Moreover, applications accessing the portable storage device at the time of disconnect may crash, hang, and/or otherwise function incorrectly as a result of the disconnection.

Second, portable storage devices often include cheaper non-volatile memory that limits the speed with which input/output (I/O) operations are processed on the portable storage devices. Furthermore, protocol overhead in the connection between a portable storage device and a computer may cause small read and write operations to be inefficient. For example, a write operation to a flash memory device may incur a delay of 100 milliseconds, which is significantly greater than the delay associated with a similar write operation to an HDD. Along the same lines, portable storage devices fabricated using cheaper memory may become unreliable after going through a limited number of erase cycles.

As a result, portable storage devices may be unsuitable as primary storage devices and/or as devices on which large numbers of I/O operations are made. For example, a USB flash drive may be too easily corrupted, broken, and/or lost to serve as primary storage for a user's important documents. Frequent I/O operations to the USB flash drive may quickly wear out the USB flash drive and may further impair the performance of applications that require the I/O operations to return before resuming execution.

Hence, what is needed is a technique for increasing the reliability, including interrupt handling; speed; and longevity of storage mechanisms on portable storage devices.

BRIEF DESCRIPTION OF THE FIGURES

FIG. 4A shows a set of blocks in a portable storage device in accordance with an embodiment.

FIG. 4B shows a set of blocks in a portable storage device in accordance with an embodiment.

FIG. 4C shows a set of blocks in a portable storage device in accordance with an embodiment.

FIG. 4D shows a set of blocks in a portable storage device in accordance with an embodiment.

FIG. 4E shows a set of blocks in a portable storage device in accordance with an embodiment.

In the figures, like reference numerals refer to the same figure elements.

DETAILED DESCRIPTION

Figure 1:
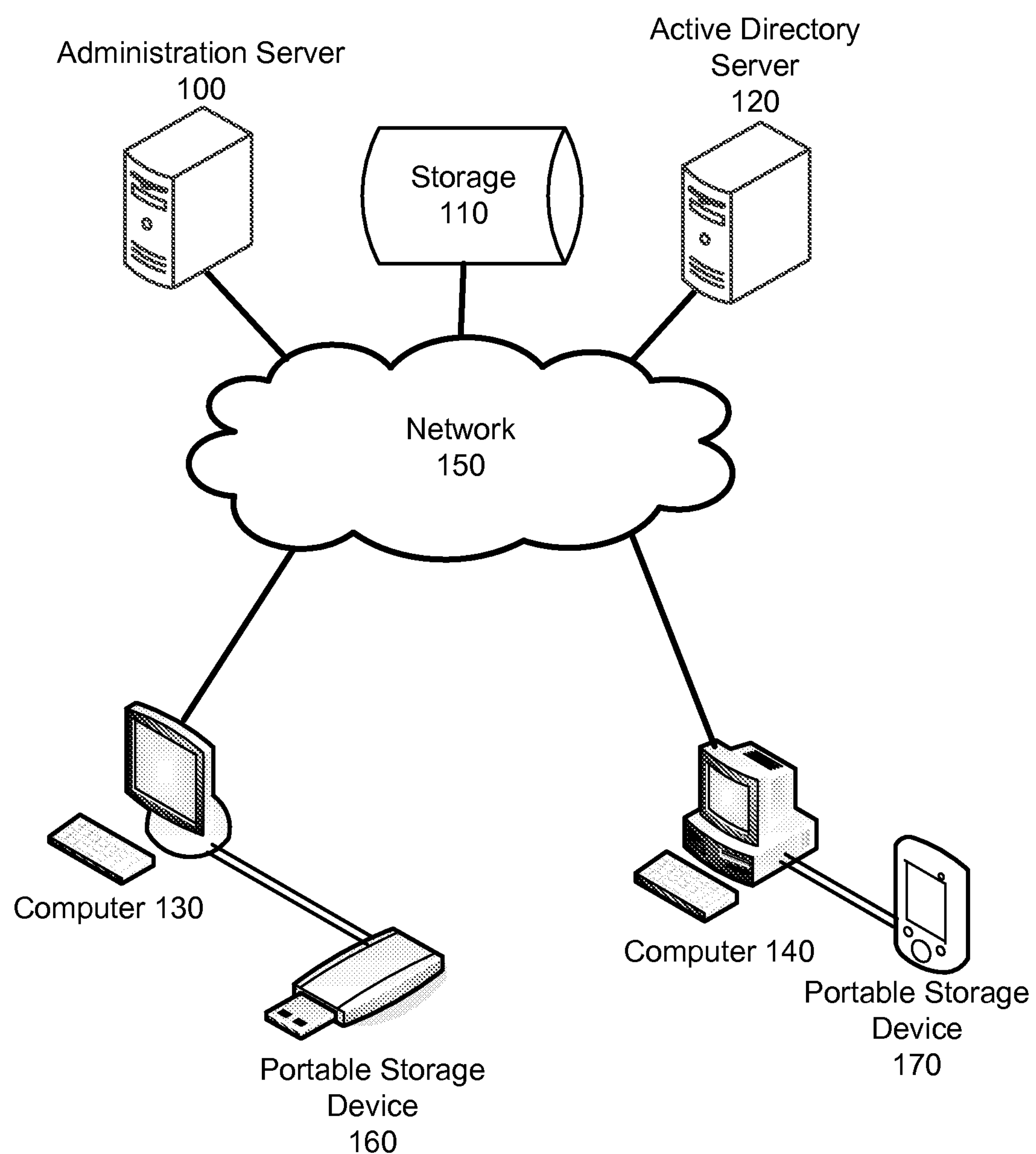
FIG. 1 shows a schematic of a system in accordance with an embodiment.

Portability of computing environments is an important consideration in modern businesses and organizations. In particular, flexibility in accessing one's computing environment (e.g., desktop environment, operating system, etc.) from a variety of devices and locations may reduce overhead associated with configuring and transferring important data between multiple computing environments and devices. As a result, conventional solutions for enhancing portability may no longer meet the Information Technology (IT) requirements of many businesses and organizations. For example, the physical portability of laptops may be negated by issues with weight and bulk, cost, data security, and/or processing power. Along the same lines, "thin client" solutions such as remote desktops may include limitations such as the inability to use normal desktop apps, limited offline functionality, and/or trust issues with service providers.

The aforementioned issues may be mitigated by storing a computing environment on a portable storage device and using virtualization to run the computing environment on any compatible computer. A number of innovations may further improve the reliability and usability of the computing environment, particularly with respect to disadvantages associated with portable storage devices such as flash memory devices. First, compression coupled with on-the-fly decompression may improve flash performance and throughput. Next, optimization of the virtual machine image (e.g., removing drivers, system restore points and uninstall scripts; emptying the page file; zeroing free space) may allow the virtual machine image to fit on most portable memory devices.

Security issues may be addressed using on drive encryption, backups of the image, and remotely administered "lock-out" or "self-destruct" features that wipe the portable storage device if the device is reported lost and is subsequently connected to the Internet. Malware and virus protection may be enhanced by separating system and user data in the virtual machine image.

Finally, the loading and updating of the computing environment from the portable storage device may be enabled through improved techniques for processing input/output (I/O) to the portable storage device. Such techniques may include buffering and/or batch processing of write operations, caching of data from the portable storage device, and/or decoupling I/O operations from the computing environment so that the computing environment may continue executing as the I/O operations are processed.

Embodiments provide a method and system for processing input/output (I/O) operations associated with a portable storage device. The portable storage device may correspond to a Universal Serial Bus (USB) flash drive, a mobile computing device (e.g., mobile phone, personal digital assistant (PDA), etc.), a flash memory card, and/or other types of portable memory devices. The I/O operations may be made from a host computer system coupled to the portable storage device, such as a laptop computer, personal computer, workstation, and/or other type of electronic computing device.

More specifically, embodiments provide a method and system for intercepting and managing I/O operations from a virtual computing environment to the portable storage device. The virtual computing environment may be stored on the portable storage device and loaded into the host computer system. Next, I/O operations from the virtual computing environment to the portable storage device may be intercepted and decoupled from the virtual computing environment. In other words, each I/O operation may be processed independently of a representation of the I/O operation to the virtual computing environment.

In one or more embodiments, I/O operations to the portable storage device include read operations and write operations. A read operation may be processed by determining one or more locations storing data requested in the read operation and retrieving the data from the location(s) based on an efficiency of accessing the data at the location(s). A write operation may be processed by storing the write operation in a log and returning control to the virtual computing environment after the write operation is stored in the log. Data specified by the write operation may then be transferred from the log to the portable storage device after the log's capacity is reached. Moreover, the write operation may not be committed until the write operation is reflected in a location data structure that maps blocks stored in the portable storage device to a representation of the blocks in the virtual computing environment.

FIG. 1 shows a schematic of a system in accordance with an embodiment. As shown in FIG. 1, the system includes an administration server 100, storage 110, an active directory server 120, a set of computers 130-140, a network 150, and a set of portable storage devices 160-170. Each of the components is described in further detail below.

Computers 130-140 may correspond to electronic computing devices that operate as computing devices for users of computers 130-140. For example, each computer 130-140 may correspond to a personal computer (PC), laptop computer, and/or workstation. Network 150 may correspond to a computer network, such as a local area network (LAN), wide area network (WAN), wireless network, intranet, internet, and/or another type of network that facilitates communication between devices (e.g., administration server 100, storage 110, active directory server 120, computers 130-140) connected to network 150. For example, computers 130-140 may operate as clients in network 150 and allow users of computers 130-140 to send and receive emails, retrieve webpages, and/or send and receive files with other computers and/or servers (e.g., administration server 100, active directory server 120) on network 150.

Computers 130-140 may serve as host computing resources and environments for guest virtual computing environments. In one or more embodiments, the virtual computing environments correspond to virtual machines that execute operating systems locally on computers 130-140, but in isolation from other virtual machines and host computing environments (e.g., native operating systems) on computers 130-140. The virtual computing environments may also provide other types of virtualization to users of computers 130-140, such as application virtualization and/or resource (e.g., network, memory, storage, processor, etc.) virtualization. For example, computer 130 may include three virtual computing environments respectively running Linux, Mac OS X (OS X™ is a registered trademark of Apple Inc.), and Microsoft Windows (Microsoft Windows™ is a registered trademark of Microsoft Corp.). Applications and/or processes that are specific to an operating system may thus run on computers 130-140 within the virtual computing environment containing the operating system. In other words, the execution of one or more virtual computing environments on computers 130-140 may provide increased versatility, utilization of resources, and/or security to computers 130-140. Software such as VMware Workstation (Windows), VMware Fusion (Mac) (VMware Fusion™ is a registered trademark of VMware, Inc.), Parallels, and VirtualBox (VirtualBox™ is a registered trademark of Sun Microsystems, Inc.) may be used to provide these capabilities.

In one or more embodiments, the system of FIG. 1 enables the central management and local execution of virtual computing environments. Such central management and local execution may allow virtual computing environments to be configured from a central location and efficiently deployed to multiple users from the central location. Moreover, changes and updates to the virtual computing environments may be automatically propagated to the users from the central location, resulting in significant savings in time and resources. An example of a central management solution for locally executed virtual computing environments may include the MokaFive Server, Player and Creator products offered by MokaFive (moka5, Inc. a Delaware corporation). In particular, the MokaFive Player may be used with computers 130-140 to locally execute a centrally defined and managed virtual computing environment according to rules and access controls defined in the MokaFive Server.

In one or more embodiments, administration server 100 is a server that supports centralized definition of virtual computing environments and management of access and permissions to the same for local execution. For example, administration server 100 may correspond to the MokaFive Server. Administration server 100 may itself execute in a virtual computing environment, (e.g. a VMware ESX environment). For example, an administrator of virtual computing environments for computers 130-140 may create, configure, and delete the virtual computing environments by interacting with administration server 100 through a management interface (e.g., graphical user interface (GUI), web-based user interface, etc.) provided by administration server 100.

In one or more embodiments, active directory server 120 provides network-based directory services. For example, active directory server 120 may correspond to a Microsoft Active Directory (Active Directory™ is a registered trademark of Microsoft Corp.) Domain Controller, OpenLDAP server, OpenID, and/or another commercially available directory server. More specifically, active directory server 120 may store, organize, and provide access to users, groups, and permissions associated with virtual computing environments managed through administration server 100. For example, active directory server 120 may enable a hierarchical framework of services (e.g., virtual computing environments) and users (e.g., user accounts and groups) within network 150 to be used by administration server 100 in defining access permissions and policies for virtual computing environments.

In one or more embodiments, virtual computing environments executed on computers 130-140 are stored in storage 110. Storage 110 may correspond to network attached storage (NAS), a web server with attached storage, a storage area network (SAN), and/or another storage mechanism that is accessible through network 150. Computers 130-140 may obtain the virtual computing environments from storage 110 through network 150 and execute the virtual computing environments locally to enable users of computers 130-140 to interact with the virtual computing environments.

In particular, each computer 130-140 may include one or more subscriptions to virtual computing environments. Each subscription may identify administration server 100 and a specific virtual computing environment provided by administration server 100. To execute the virtual computing environment, a user of the computer may provide authentication credentials for the virtual computing environment to administration server 100, which may relay the authentication credentials to the active directory server 120 as necessary. If the user is authorized to use the virtual computing environment, the virtual computing environment is downloaded from storage 110 over network 150 and loaded on the computer for use by the user. Loading and use of virtual computing environments within computers is discussed in further detail below with respect to FIG. 2.

Furthermore, virtual computing environments executing on computers 130-140 may be stored on and/or loaded from portable storage devices 160-170 coupled to computers 130-140, including Universal Serial Bus (USB) flash drives, flash memory cards, and/or portable computing devices (e.g., mobile phones, portable media players, etc.). Portable storage devices 160-170 may also include virtualization software (e.g., hypervisors), subscription information, user data, and/or other information required to load the virtual computing environments into any compatible computer (e.g., x86 computers) without pre-installation of software on the computer. In other words, the virtual computing environments and all information and software required to execute the virtual computing environments may be loaded, stored, and managed entirely from portable storage devices 160-170 instead of from computers 130-140 and/or network 150. However, network 150 may also be accessed periodically to retrieve updates to the virtual computing environments and/or authenticate the user as required by the access policies set on administration server 100.

Figure 2:
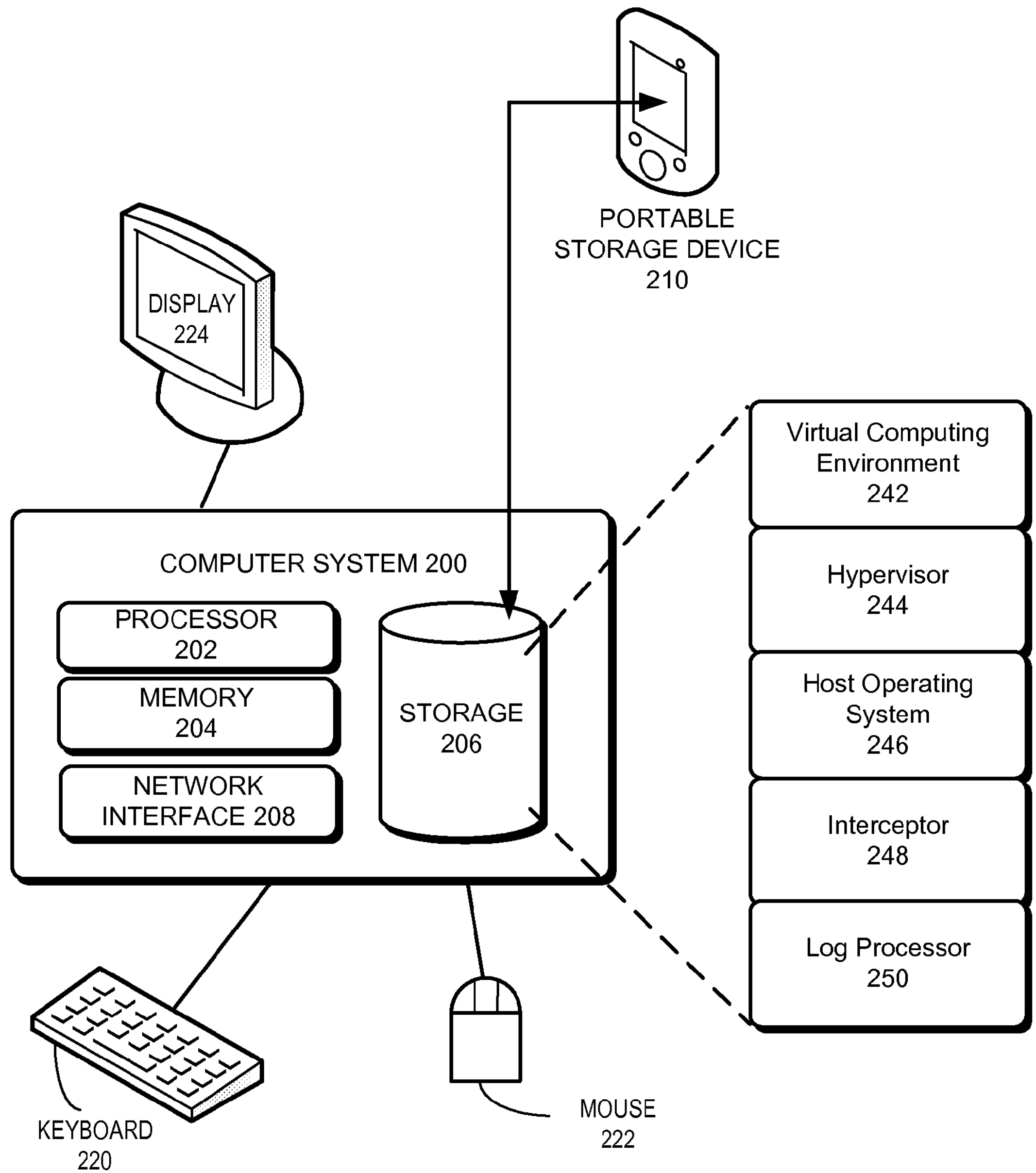
FIG. 2 shows a computer system in accordance with an embodiment.

FIG. 2 shows a computer system 200 in accordance with an embodiment. Computer system 200 may correspond to an electronic computing device (e.g., computers 130-140 of FIG. 1) that is connected to a network, such as network 150 of FIG. 1. Computer system 200 includes a processor 202, memory 204, storage 206, network interface 208, and/or other components found in electronic computing devices. Processor 202 may support parallel processing and/or multithreaded operation with other processors in computer system 200. Computer system 200 may also include input/output (I/O) devices such as a keyboard 220, a mouse 222, and a display 224.

Computer system 200 may include functionality to execute various components of the present embodiments. In particular, computer system 200 may include a host operating system 246 that coordinates the use of hardware and software resources on computer system 200, as well as one or more applications that perform specialized tasks for the user. To perform tasks for the user, applications may obtain the use of hardware resources on computer system 200 from host operating system 246, as well as interact with the user through a hardware and/or software framework provided by host operating system 246.

In particular, computer system 200 may execute a virtual computing environment 242 (e.g., virtual machine) obtained from network interface 208. For example, computer system 200 may download virtual computing environment 242 over the network from network-accessible storage (e.g., storage 110 of FIG. 1) according to instructions specified by an administration server (e.g., administration server 100 of FIG. 1). A hypervisor 244 on computer system 200 may then load virtual computing environment 242 into computer system 200 for local execution of virtual computing environment 242 on computer system 200.

In one or more embodiments, hypervisor 244 corresponds to a hosted hypervisor (e.g., type II hypervisor) that runs within host operating system 246 and obtains resources for the domains through host operating system 246. Alternatively, hypervisor 244 may function as a native hypervisor (e.g., type I hypervisor) that runs directly on hardware in computer system 200. Hypervisor 244 may also be referred to as a virtual machine monitor. For example, hypervisor 244 may include the MokaFive Player.

Within computer system 200, virtual computing environment 242 may execute independently of a network connection with the administration server and/or storage, subject to any security policies defined for virtual computing environment 242 on the administration server. Alternatively, virtual computing environment 242 may require an intermittent and/or constant connection to the network as specified by a security policy on the administration server. For example, virtual computing environment 242 may continue executing on computer system 200 only if computer system 200 is capable of communicating with the administration server on a periodic basis (e.g., weekly). Such periodic communication may be required to enforce security in virtual computing environment 242 and/or to enable remote termination of virtual computing environment 242 from the administration server. A network connection may also be required for updates to virtual computing environment 242 to be received by computer system 200 from the network in accordance with a notification from the administration server.

As mentioned previously, virtual computing environment may alternatively be obtained from a portable storage device 210 coupled to computer system 200 via a physical (e.g., USB) or wireless (e.g., Wireless USB, Bluetooth, Wi-Fi) connection with computer system 200. In particular, portable storage device 210 may store virtual computing environment 242, hypervisor 244, directory (e.g., user and user group) information, user data (e.g., documents, personal files, etc.), and/or other information required to load and execute virtual computing environment 242 on computer system 200 and/or other compatible computer systems (e.g., laptop computers, personal computers, workstations, etc.). Virtual computing environment 242 and associated information on portable storage device 210 may initially be obtained from the network and copied to portable storage device 210. Similarly, backups of virtual computing environment 242 and associated information may exist on the network and/or on computer system 200. Notably, one advantage according to these embodiments is the ability to connect portable storage device 210 to any compatible computer (e.g., x86 computer) and run virtual computing environment 242 on the computer's hardware resources (processor, network, display, keyboard, mouse, host OS and drivers) without obtaining and/or installing software required to run virtual computing environment 242 on the computer.

To reduce the amount of space occupied by virtual computing environment 242 and associated information on portable storage device 210, nonessential components of virtual computing environment 242 may be removed from the image of virtual computing environment 242 on portable storage device 210. For example, an operating system image may be configured to fit on portable storage device 210 by removing drivers, disabling and/or removing system restore points and uninstall scripts, emptying the page file, and/or zeroing free space on the image.

In addition, software modules used to facilitate the execution of virtual computing environment 242 may be loaded to memory 204 or storage 206 on computer system 200 from portable storage device 210. Such software modules may include hypervisor 244, an interceptor 248, and/or a log processor 250. The functionality of interceptor 248 and log processor 250 is described below and with respect to FIG. 3.

Furthermore, data, settings, user applications, and/or other user-specific configurations associated with virtual computing environment 242 are generally stored and managed on portable storage device 210 to allow the user maximum flexibility to move among different computers (e.g. home computer, work computer, laptop computer, desktop computer, etc.). Consequently, portable storage device 210 may facilitate the portability and accessibility of virtual computing environment 242 by further decoupling the execution of virtual computing environment 242 from a particular computer system (e.g., computer system 200) and/or network connection, and by providing a physical mechanism for storing and transporting virtual computing environment 242 and associated data and software in a ready-to-use form.

The loading and updating of virtual computing environment 242 and associated information from portable storage device 210 may result in the frequent processing of I/O operations on portable storage device 210. For example, one or more extensive read operations may be performed on portable storage device 210 to load virtual computing environment 242, hypervisor 244, and/or other associated information from portable storage device 210 into memory 204 of computer system 200 for execution. Similarly, the updating of documents, files, and/or other user-specific configuration settings associated with virtual computing environment 242 may cause a large number of random write operations to be performed in rapid succession to the portable storage device 210.

However, characteristics of storage mechanisms on portable storage device 210 may limit the reliability and speed associated with processing I/O operations on portable storage device 210. In particular, an unexpected disconnection of portable storage device 210 from computer system 200 may cause data on portable storage device 210 to be lost or corrupted and may further interrupt the execution of virtual computing environment 242 on computer system 200. Disconnection may be a particularly significant problem if portable storage device 210 is a smart phone, such as a Blackberry (Blackberry™ is a registered trademark of Research in Motion Ltd.) device or iPhone (iPhone™ is a registered trademark of Apple Inc.), that may disconnect from computer system 200 if a phone call is received. Large numbers of random writes to portable storage device 210 may additionally incur a noticeable delay and may cause applications making the writes to hang. Furthermore, flash memory devices may become unreliable after a limited number of erase cycles; as a result, frequent writes to flash memory on portable storage device 210 may increase the likelihood of failure and data loss within the flash memory.

To facilitate the processing of I/O operations on portable storage device 210, interceptor 248 and log processor 250 may include functionality to intercept and decouple I/O operations from virtual computing environment 242 to portable storage device 210. Because interceptor 248 and log processor 250 are used to facilitate the execution of virtual computing environment 242 on computer system 200, interceptor 248 and log processor 250 may be stored in portable storage device 210 along with hypervisor 242 and loaded into computer system 200 from portable storage device 210. As discussed below with respect to FIG. 3, interceptor 248 and log processor 250 may allow the I/O operations to be processed independently of representations of the I/O operations to virtual computing environment 242, thus improving the performance, speed, and reliability of I/O operations on portable storage device 210.

Figure 3:
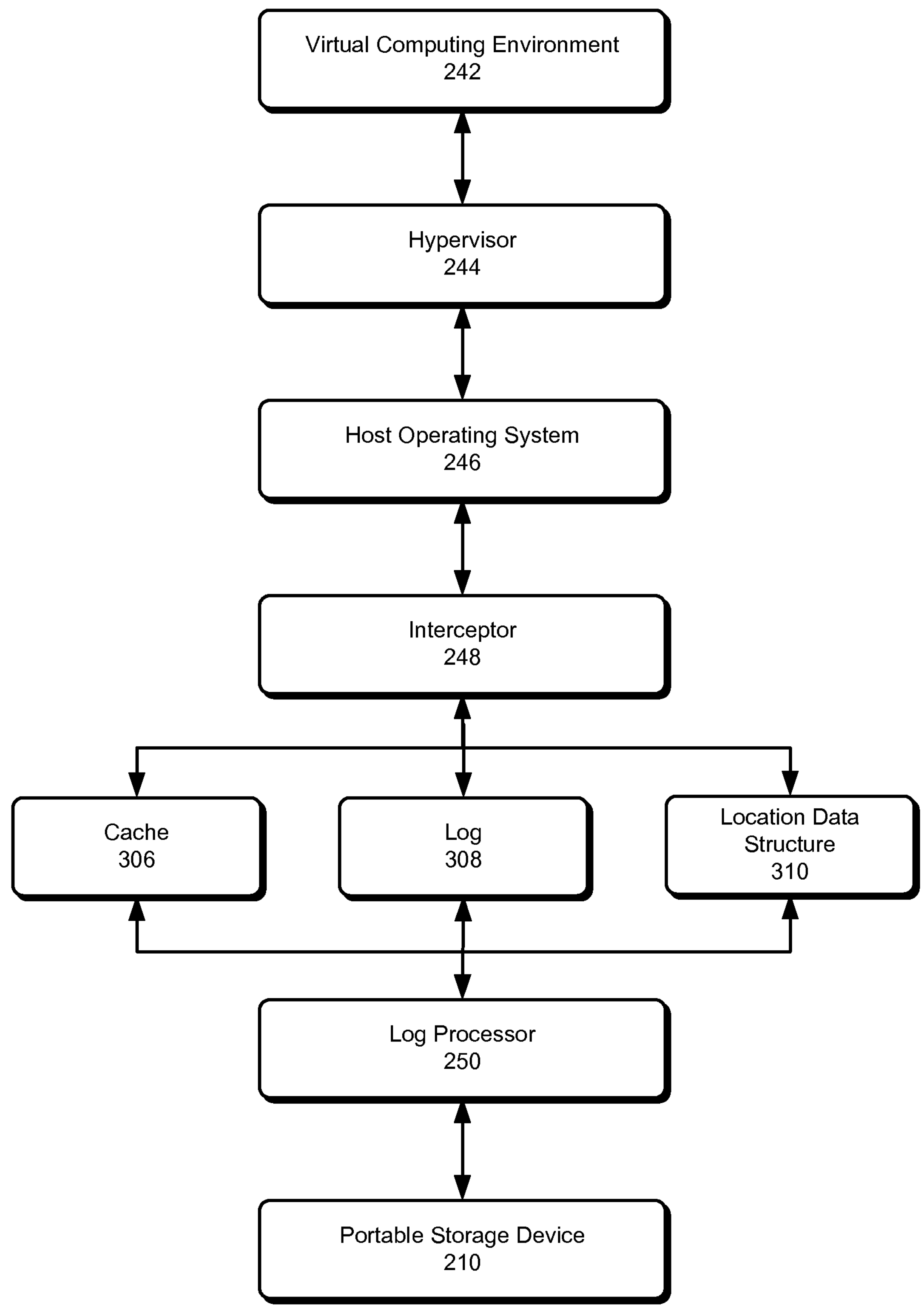
FIG. 3 shows a system for processing I/O operations associated with a portable storage device in accordance with an embodiment.

FIG. 3 shows a system for processing I/O operations associated with portable storage device 210 in accordance with an embodiment. More specifically, FIG. 3 shows a system for processing I/O operations from virtual computing environment 242 to portable storage device 210. As discussed above, virtual computing environment 242 may be loaded from portable storage device 210 and may execute on a computer system (e.g., computer system 200 of FIG. 2) coupled to portable storage device 210. Moreover, because user-specific changes to virtual computing environment 242 may be managed using portable storage device 210, large numbers of I/O operations may be made from virtual computing environment 242 to portable storage device 210. To facilitate the processing of such I/O operations, the system of FIG. 3 includes interceptor 248, log processor 250, a cache 306, a log 308, and a location data structure 310.

In one or more embodiments, an I/O operation originating from virtual computing environment 242 is received by hypervisor 244 and relayed to host operating system 246. However, instead of executing directly on portable storage device 210 from host operating system 246, the I/O operation is intercepted by interceptor 248. Interceptor 248 may be implemented as a kernel driver, filesystem driver, partition driver, disk driver, and/or USB driver on the computer system. Interceptor 248 may also be implemented as a shim in hypervisor 244 or host operating system 246 and/or on hardware in portable storage device 210.

Upon intercepting the I/O operation, interceptor 248 may store the I/O operation in log 308. Log 308 may be located in main memory on the computer system, in a hard disk drive on the computer system, and/or in another storage mechanism on the computer system. The I/O operation may be obtained from log 308 and processed by interceptor 248 and/or log processor 250 independently of a representation of the I/O operation provided to virtual computing environment 242. In other words, the I/O operation may be decoupled from virtual computing environment 242 by interceptor 248 and/or log processor 250 in a way that improves the reliability and/or speed of the I/O operation on portable storage device 210. Furthermore, I/O operations in log 308 may be processed in the order in which the I/O operations were received by interceptor 248 and/or written to log 308. As a result, log 308 may correspond to a queue of I/O operations to be processed by interceptor 248 and/or log processor 250.

In one or more embodiments, interceptor 248 provides a virtualized volume corresponding to portable storage device 210 to host operating system 246. Furthermore, improved reliability and speed of access to the virtual volume may be facilitated by cache 306, log 308, and location data structure 310.

In one or more embodiments, the storage of I/O operations in log 308 allows interceptor 248 and/or log processor 250 to recover from an unexpected disconnection of portable storage device 210 from the computer system. In particular, interceptor 248 may monitor notifications from host operating system 246 for error codes and/or messages corresponding to disconnection of portable storage device 210 from the computer system. On the other hand, interceptor 248 may deduce that portable storage device 210 has been disconnected if an I/O operation takes more than a pre-specified amount of time to complete.

Upon reconnection of portable storage device 210, interceptor 248 may examine portable storage device 210 for corruption and changes to portable storage device 210 after disconnection (e.g., by another computer system). First, interceptor 248 may identify portable storage device 210 based on the serial number, manufacturer identifier (ID), and/or device size of portable storage device 210. Interceptor 248 may also examine portable storage device 210 for corruption by verifying that all blocks on portable storage device 210 can be read and/or by calculating and comparing checksums on portable storage device 210.

To determine if changes were made to portable storage device 210 after disconnection from the computer system, interceptor 248 may examine the File Allocation Table (FAT), access timestamps, log state, filesystem dirty bit, and/or other metadata on portable storage device 210. Additionally, interceptor 248 may write a unique identifier (e.g., nonce) to portable storage device 210 when the virtual volume is mounted on the computer system; if the nonce does not match after portable storage device 210 is reconnected after an unexpected disconnection, portable storage device 210 may have been modified after the disconnection.

Interceptor 248 may further mitigate the alteration of portable storage device 210 after an unexpected disconnection by overwriting the partition type, partition table, filesystem type, and/or other attributes of portable storage device 210. Such overwriting may mildly corrupt portable storage device 210 such that portable storage device 210 is less likely to mount cleanly on another computer system. Furthermore, interceptor 248 may clear writes associated with detecting changes associated with an unexpected disconnection of portable storage device 210 during a clean disconnection of portable storage device 210 from the computer system.

Based on the assessed state of portable storage device 210 after reconnection to the computer system, interceptor 248 may resume the processing of I/O operations on portable storage device 210. For example, if portable storage device 210 has not been altered or corrupted while disconnected from the computer system, interceptor 248 may resume processing I/O operations from log 308 at the point at which portable storage device 210 was last disconnected from the computer system. However, if portable storage device 210 shows signs of alteration or corruption after the disconnection, interceptor 248 may begin processing I/O operations from an earlier point in log 308. Interceptor 248 may also use location data structure 310 and/or cache 306 to recover data from portable storage device 210 if corruption or alteration after an unexpected disconnection is detected, as discussed below.

In one or more embodiments, location data structure 310 includes a mapping of blocks stored in portable storage device 210 to a representation of the blocks in virtual computing environment 242. Location data structure 310 may be stored in portable storage device 210 and copied to main memory on the computer system upon connecting portable storage device 210 to the computer system. To locate the blocks specified by virtual computing environment 242 in an I/O operation, interceptor 248 may use the mapping stored in location data structure 310. Furthermore, the mapping may be stored as a binary tree, a B+ tree, a page table, and/or other data structure used to sort and manage blocks of data.

In other words, location data structure 310 may allow the layout of blocks on portable storage device 210 to be decoupled from the layout of the blocks as presented to virtual computing environment 242. Such a decoupling may improve the processing of write operations on portable storage device 210 by interceptor 248 and log processor 250. More specifically, write operations may be stored in log 308 by interceptor 248 until log 308 reaches a predetermined capacity. After storing each write operation in log 308, interceptor 248 may return control to virtual computing environment 242 to enable virtual computing environment 242 to continue executing without being affected by latency associated with writing to portable storage device 210 (e.g., a flash memory device).

When log 308 reaches capacity with intercepted write operations from virtual computing environment 242, data specified by the write operations is transferred to portable storage device 210 by log processor 250 in a single consolidated write operation. For example, write operations may be appended to a one-megabyte log 308 as the write operations are intercepted by interceptor 248. When log 308 reaches one megabyte, log processor 250 transfers the contents of log 308 to portable storage device 210 as a contiguous chunk of data. Alternatively, write operations in log 308 may be processed periodically (e.g., every 10 minutes) and/or during idle periods that contain little to no I/O activity between virtual computing environment 242 and portable storage device 210. The consolidated write operation may then be committed by updating location data structure 310 to reflect the location of the newly written blocks in portable storage device 210 so that interceptor 248 may process subsequent I/O operations to portable storage device 210. Updates to the in-memory location data structure 310 may additionally be copied to the portable storage device to enable use of the portable storage device across different computers.

Data integrity on portable storage device 210 may further be enhanced using the following mechanisms. When writes to the virtual volume have completed (e.g., when host operating system 246 signals to the disk subsystem that the filesystem is in a consistent state), interceptor 248 may initiate a log processing operation and write location data structure 310 to disk (e.g., on the computer system and/or portable storage device 210). Sync operations (e.g., FlushFileBuffers, fsync) for the virtual volume from host operating system 246 may also trigger the log processing operation and write of location data structure 310 to disk. Furthermore, when a periodic log processing operation is initiated, log processor 250 may wait a short amount of time for host operating system 246 to signal that the filesystem is in a consistent state before committing location data structure 310 to disk.

Cache 306 may correspond to storage (e.g., memory, hard disk drive, etc.) on the computer system that is used by interceptor 248 and/or log processor 250 to maintain a partial or complete copy of data stored on portable storage device 210. Cache 306 may also include copies of log 308 created after the data is copied from portable storage device 210 to cache 306 to track subsequent changes to the data made by interceptor 248 and/or log processor 250. Alternatively, changes to portable storage device 210 may be reflected in cache 306 by incorporating I/O operations stored in copies of log 308 into the image of portable storage device 210 stored in cache 306. As a result, cache 306 may serve as a backup of portable storage device 210 that may be used to restore data in portable storage device 210 in the event of unexpected disconnection, data corruption, and/or other changes to portable storage device 210 not made by interceptor 248 or log processor 250.

As mentioned previously, location data structure 310 may allow interceptor 248 and/or log processor 250 to locate blocks specified in I/O operations from virtual computing environment 242 on portable storage device 210. Location data structure 310 may also contain mappings between blocks on portable storage device 210 and log 308 and/or mappings between blocks on portable storage device 210 and cache 306. For example, a write to portable storage device 210 by log processor 250 may be committed by establishing mappings between the newly written blocks on portable storage device 210 and log 308 and/or between the newly written blocks and cache 306.

Data recovery may further be facilitated by storing multiple versions of location data structure 310 on the computer system and/or portable storage device 210. For example, interceptor 248 and/or log processor 250 may maintain separate versions of location data structure 310 on portable storage device 210 and the computer system. Write operations to portable storage device 210 may be committed by alternating between versions with updates to reflect the most recent changes to portable storage device 210. One version of location data structure 310 may include mappings to blocks that reflect the newest write operation made by log processor 250, while the other version of location data structure 310 may not include the mappings. As a result, data corruption associated with a write operation on portable storage device 210 may be rolled back by using an older version of location data structure 310.

Because data associated with portable device 210 may be stored in multiple locations (e.g., cache 30, log 308, location data structure 310, portable storage device 210, etc.), data restoration and/or synchronization after unexpected disconnections of portable storage device 210 from the computer system may be handled in a number of ways. The method of synchronization may further depend on characteristics of portable storage device 210, data on the computer system, and/or user input. First, if portable storage device 210 is unchanged (e.g., based on generation number or hashes), interceptor 248 and/or log processor 250 may resume processing I/O operations from log 308 at the point at which portable storage device 210 was last disconnected from the computer system.

On the other hand, if portable storage device 210 has been altered or corrupted, data synchronization may be carried out by selecting a master image between data on portable storage device 210 and data on the computer system (e.g., cache 306, log 308, location data structure 310, etc.) and restoring the virtualized volume using the master image. The selection may be based on user input and/or a comparison of metadata on portable storage device 210 and the computer system. To restore to a particular master image from portable storage device 210, cache 306, log 308, and location data structure 310 may be truncated and/or updated to reflect the state of data on portable storage device 210. To restore to a particular master image from the computer system, changes to portable storage device 210 may be discarded and a restore operation may be carried out on portable storage device 210.

Finally, detailed synchronization may be carried out between the computer system and the changed portable storage device 210. In particular, an image of portable storage device 210 may be constructed from data stored in cache 306, log 308, and/or location data structure 310 and compared to portable storage device 210 at the file, file system, and/or block level. Conflicts may then be resolved using automated techniques and/or user input. For example, changes to system data for virtual computing environment 242 may be rolled back on portable storage device 210 using a master image obtained from the computer system and/or network storage (e.g., storage 110 of FIG. 1) accessible from the computer system. However, synchronization of user data (e.g., documents, media files, etc.) for virtual computer environment 242 may require that the user select between two different versions of the same file. Alternatively, an automated selection between two different versions of the same file may be carried out by choosing the version with a later timestamp.

In one or more embodiments, interceptor 248 accelerates read operations from virtual computing environment 242 by retrieving data requested in the read operations from one or more locations containing the data based on the efficiency of accessing the data at the location(s). In particular, interceptor 248 may use location data structure 310 and/or other information (e.g., a generation number associated with log 308) to determine if blocks requested in the read operation are stored in cache 306, log 308, and/or portable storage device 210. Interceptor 248 may then retrieve the blocks from cache 306, log 308, and/or portable storage device 210 based on the speed with which the blocks may be retrieved from each location. For example, interceptor 248 may first attempt to retrieve requested blocks from main memory on the computing system, then from hard disk drives on the computing system, and finally from portable storage device 210. Interceptor 248 may also retrieve requested blocks in parallel from multiple locations (e.g., computer system, portable storage device 210) to further expedite the processing of the read operation.

Interceptor 248 and/or log processor 250 may additionally implement security, space savings, integrity verification, and/or wear leveling features on portable storage device 210. More specifically, interceptor 248 and/or log processor 250 may compress, encrypt, and/or generate authentication codes for blocks specified in write operations on portable storage device 210. Similarly, interceptor 248 and/or log processor 250 may decompress, decrypt, and/or check authentication codes for blocks specified in read operations on portable storage device 210, log 308, and/or cache 306. In addition, interceptor 248 may periodically compact blocks in portable storage device 210 during idle periods to free up space and provide wear leveling on portable storage device 210. Compaction of blocks in portable storage device 210 is discussed below with respect to FIGS. 4A-4E.

Interceptor 248 may also zero free space on portable storage device 210. For example, when files are removed or truncated inside virtual computing environment 242, a signal may be sent to interceptor 248 to indicate that the blocks occupied by those files are now free. This signal may include writing zeros to the blocks, sending a message to hypervisor 244 requesting zeroing of the blocks, and/or sending a message to interceptor 248 to indicate that the blocks are zeroed. However, when interceptor 248 detects that zeros have been written to the virtual volume, interceptor 248 may not write any data to cache 306 or log 308. Instead, interceptor 248 may directly update location data structure 310 to indicate that the blocks contain zeros and are effectively free blocks. Interceptor 248 may thus save time and resources by not performing the write operation and by increasing the amount of available blocks on portable storage device 210.

The combined operation of interceptor 248 and log processor 250 may thus enable I/O operations from virtual computing environment 242 to portable storage device 210 to be processed efficiently, securely, and reliably. Moreover, the functionality of interceptor 248 and log processor 250 may be implemented in multiple ways. For example, interceptor 248 and log processor 250 may execute as separate applications, processes, and/or modules on the computer system. Alternatively, interceptor 248 and log processor 250 may be included in a single application or process that provides a virtualized volume to virtual computing environment 242 and mediates I/O operations between virtual computing environment 242 and portable storage device 210.

FIG. 4A shows a set of blocks 402-432 in a portable storage device in accordance with an embodiment. Blocks 402-416 are written with data, while blocks 418-432 are empty. As described above, blocks 402-432 may be stored on the portable device in a layout that is different from a representation of blocks 402-432 in a virtual computing environment associated with the portable storage device. In particular, blocks 402-416 may be written in one consolidated write operation that includes data specified by multiple write operations from the virtual computing environment. Furthermore, the consolidated write operation may transfer the data from the write operations to blocks 402-416 in the order in which the write operations were received from the virtual computing environment.

Consequently, data is ordered in blocks 402-416 (e.g., 0, 1, 2, 7, 6, 5, 4, 3) differently from the ordering of data within the virtual computing environment (e.g., 0, 1, 2, 3, 4, 5, 6, 7). To enable blocks 402-416 to be located in subsequent I/O operations, a location data structure (e.g., location data structure 310 of FIG. 3) may map blocks 402-416 to a representation of blocks 402-416 in the virtual computing environment. For example, the location data structure may map the third block in the virtual computing environment to block 416.

FIG. 4B shows blocks 402-432 in accordance with an embodiment. More specifically, FIG. 4B shows blocks 402-432 after data is stored in blocks 418-424 by a second consolidated write operation. As shown in FIG. 4B, blocks 418-424 contain new data for the zeroth, first, fifth, and third blocks in the virtual computing environment. However, the second consolidated write operation has not been committed to the location data structure. As a result, a serialized copy of the location data structure may still map to old locations of the zeroth, first, fifth, and third blocks (e.g., block 402, block 404, block 412, block 416) instead of the new locations (e.g., blocks 418-424).

FIG. 4C shows blocks 402-432 in accordance with an embodiment. In particular, FIG. 4C shows blocks 402-432 after the second consolidated write operation is committed to the location data structure. Blocks 402, 404, 412, and 416 are now empty because the serialized copy of the location data structure no longer maps to (e.g., references) data in blocks 402, 404, 412, and 416. Instead, the most recent copy of the location data structure stored on the portable storage device now maps to new data in blocks 418-424. I/O operations to data stored in the zeroth, first, fifth, and third blocks in the virtual computing environment may thus be directed to blocks 418-424 instead of to older versions of the data in blocks 402, 404, 412, and 416. For example, a read operation to the fifth block in the virtual computing environment may retrieve data from block 422 instead of from block 412.

FIG. 4D shows blocks 402-432 in accordance with an embodiment. In particular, FIG. 4D shows blocks 402-432 after blocks 402-432 are compacted but before the compaction is committed to the location data structure. As shown in FIG. 4D, the compaction consolidates and reorders data from blocks 406, 408, 410, and 414 and copies the data to blocks 426-432. The consolidation of the data may free blocks 402-416 for storage of subsequent write operations after the compaction is committed, while the reordering of the data in blocks 426-432 to maximize contiguousness may allow subsequent reads of the data to be more efficient.

FIG. 4E shows blocks 402-432 in accordance with an embodiment. More specifically, FIG. 4E shows blocks 402-432 after the compaction of FIG. 4D is committed to the location data structure. Because the version of the location data structure serialized to the portable device maps to data in blocks 426-432 instead of data in blocks 406, 408, 410, and 414, blocks 402-416 form a contiguous section of free space that may be written with new data in subsequent write operations. Moreover, the reordering and consolidation of data in blocks 418-432 may increase the efficiency with which reads to blocks 418-432 are made.

Figure 5:
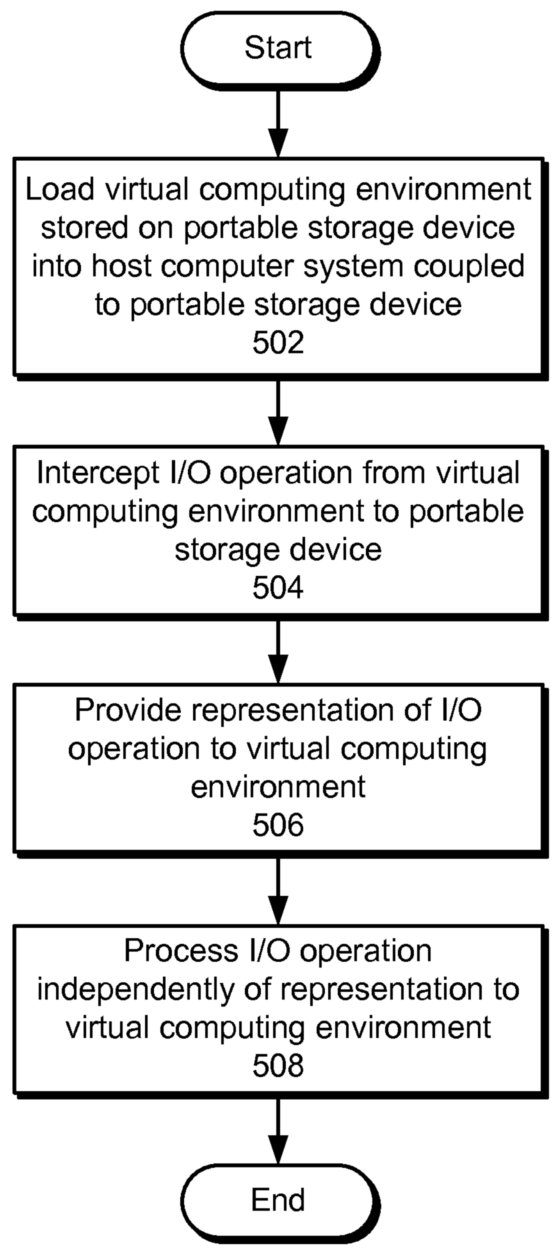
FIG. 5 shows a flowchart illustrating the processing of an I/O operation associated with a portable storage device in accordance with an embodiment.

FIG. 5 shows a flowchart illustrating the processing of an I/O operation associated with a portable storage device in accordance with an embodiment. In one or more embodiments, one or more of the steps may be omitted, repeated, and/or performed in a different order. Accordingly, the specific arrangement of steps shown in FIG. 5 should not be construed as limiting the scope of the embodiments.

Initially, a virtual computing environment stored on the portable storage device is loaded into a host computer system coupled to the portable storage device (operation 502). The virtual computing environment may provide application virtualization, operating system virtualization, resource virtualization, and/or other types of virtualization to a user of the host computer system. Furthermore, user-specific changes to the virtual computing environment may be stored and managed on the portable storage device. As a result, the virtual computing environment may generate a large number of I/O operations (e.g., read operations, write operations, etc.) for execution on the portable storage device.

To improve the reliability and speed of processing the I/O operations, each I/O operation from the virtual computing environment to the portable storage device may be intercepted (operation 504) before the I/O operation reaches the portable storage device. Next, the I/O operation may be decoupled from the virtual computing environment by providing a representation of the I/O operation to the virtual computing environment (operation 506) and processing the I/O operation processed independently of the representation to the virtual computing environment (operation 508). The decoupling of the I/O operation may improve the reliability and integrity of data in the portable storage device while reducing latency and overhead associated with processing the I/O operation.

Figure 6:
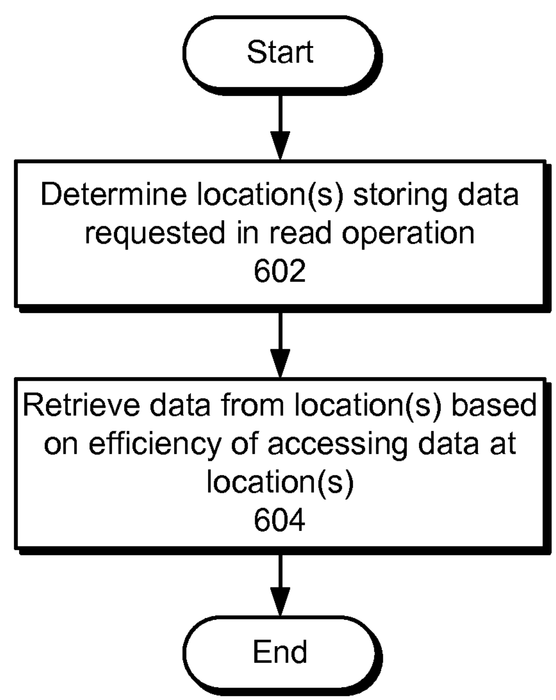
FIG. 6 shows a flowchart illustrating the processing of a read operation from a virtual computing environment to a portable storage device in accordance with an embodiment.

FIG. 6 shows a flowchart illustrating the processing of a read operation from a virtual computing environment to a portable storage device in accordance with an embodiment. In one or more embodiments, one or more of the steps may be omitted, repeated, and/or performed in a different order. Accordingly, the specific arrangement of steps shown in FIG. 6 should not be construed as limiting the scope of the embodiments.

First, one or more locations storing data requested in the read operation are determined (operation 602). For example, a location data structure may be examined to determine if the requested data is stored in the portable storage device, a cache, and/or a log. Next, the data is retrieved from the location(s) based on the efficiency of accessing the data at the location(s) (operation 604). For example, the data may first be retrieved from main memory if available, then from a hard disk drive if available, and finally from the portable storage device, which is associated with the slowest access times. The efficiency of accessing the data may also be increased by retrieving the data in parallel from multiple locations.

Figure 7:
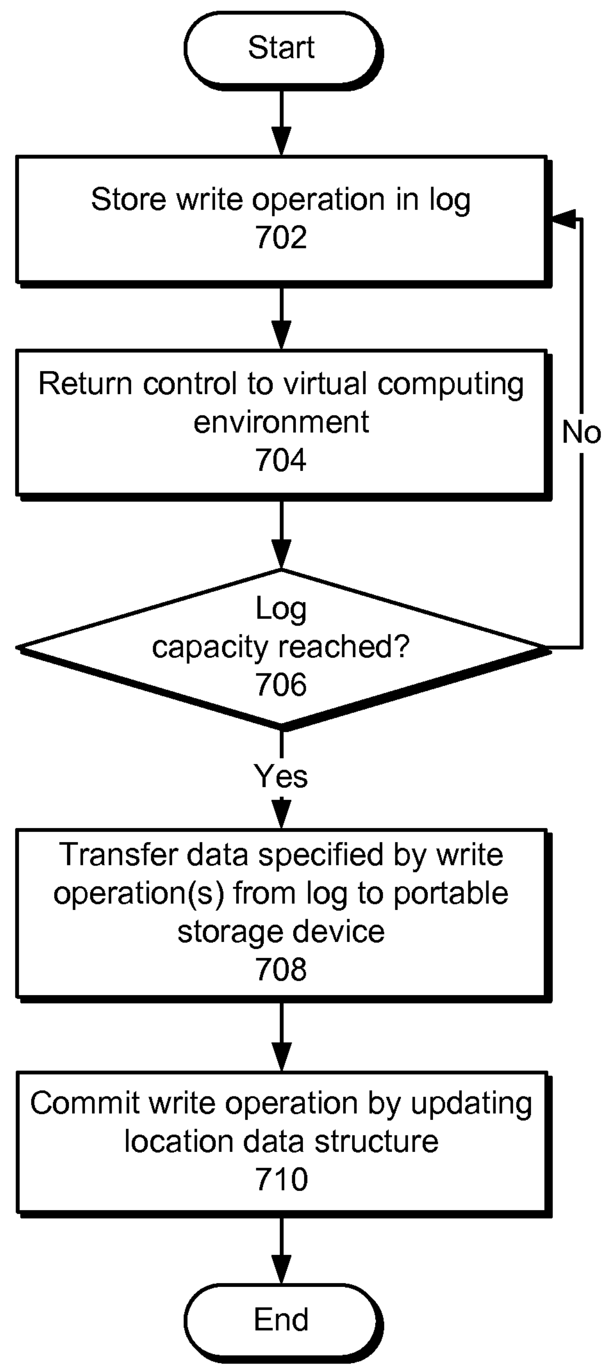
FIG. 7 shows a flowchart illustrating the processing of a write operation from a virtual computing environment to a portable storage device in accordance with an embodiment.

FIG. 7 shows a flowchart illustrating the processing of a write operation from a virtual computing environment to a portable storage device in accordance with an embodiment. In one or more embodiments, one or more of the steps may be omitted, repeated, and/or performed in a different order. Accordingly, the specific arrangement of steps shown in FIG. 7 should not be construed as limiting the scope of the embodiments.

First, the write operation is stored in a log (operation 702). Next, control is returned to the virtual computing environment (operation 704) to allow the virtual computing environment to continue executing without waiting for the write operation to complete. The write operation to the log may not be processed until the log's capacity is reached (operation 706). On the other hand, write operations to the log may be processed periodically or during idle periods that contain little to no I/O activity between the virtual computing environment and portable storage device. If the log's capacity is not yet reached, additional write operations are stored in the log (operation 702) and control is subsequently returned to the virtual computing environment (operation 704) after each store until the log's capacity is reached.

Once the log has reached capacity, data specified by the write operation(s) is transferred from the log to the portable storage device (operation 708). In other words, the data may be written to the portable storage device in the order in which the write operations were stored in the log. As a result, the layout of the data in the portable storage device may be different from the layout of the data used by the virtual computing environment. Compression, encryption, and/or generation of authentication codes may also occur prior to writing the data to the portable storage device. Next, the write operation is committed by updating a location data structure (operation 710) that maps a set of blocks stored in the portable storage device to a representation of the blocks in the virtual computing environment. In other words, the location data structure may allow blocks specified in subsequent I/O operations to be located on the portable storage device.

Figure 8:
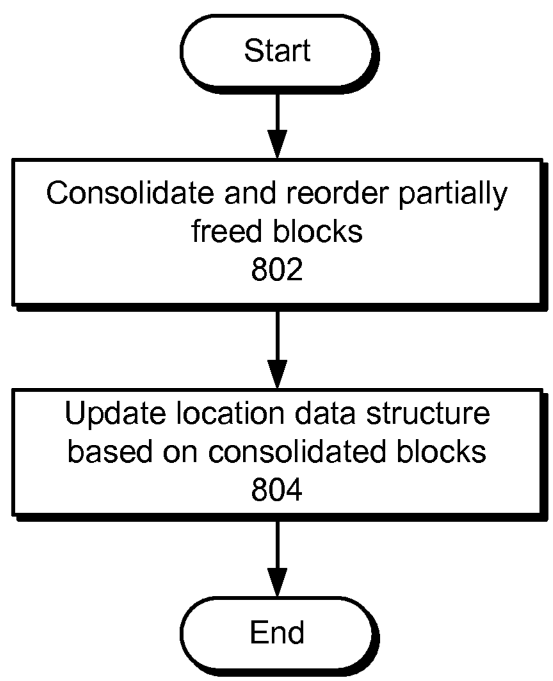
FIG. 8 shows a flowchart illustrating the process of compacting blocks in a portable storage device in accordance with an embodiment.

FIG. 8 shows a flowchart illustrating the process of compacting blocks in a portable storage device in accordance with an embodiment. In one or more embodiments, one or more of the steps may be omitted, repeated, and/or performed in a different order. Accordingly, the specific arrangement of steps shown in FIG. 8 should not be construed as limiting the scope of the embodiments.

Initially, partially freed blocks in the portable storage device are consolidated and reordered (operation 802). For example, one-megabyte chunks of data with unreferenced sectors may be consolidated and reordered within a new one-megabyte chunk. Next, the location data structure for the portable storage device is updated based on the consolidated blocks (operation 804). For example, the location data structure may be updated to map to the new chunk and free the old chunks. As a result, compaction may both free up space in the portable storage device and increase the efficiency with which reads are conducted in the portable storage device.

The description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for processing an input/output (I/O) operation, comprising:

loading a virtual computing environment stored on a portable storage device into a host computer system coupled to the portable storage device, wherein the host computer system includes a physical memory;

maintaining a mapping of logical memory locations in the virtual computing environment to memory locations in the portable storage device;

intercepting an invocation of the I/O operation from the virtual computing environment in the host computer system to the portable storage device, wherein the I/O operation is one of a read operation or a write operation, and wherein intercepting a write operation involves processing the write operation by:

storing the write operation in a log that stores write operations that are yet to be processed, and returning control to the virtual computing environment upon storing the write operation in the log;

decoupling the invocation of the I/O operation from the processing of the I/O operation, wherein the decoupling comprises providing a representation of the I/O operation to the virtual computing environment, wherein processing a write operation involves transferring data specified by the write operation from the log to the portable storage device; and processing the I/O operation in the portable storage device independently of the representation of the I/O operation to the virtual computing environment in the host computer system using the mapping.

2. The computer-implemented method of claim 1, wherein processing the read operation involves:

determining one or more locations storing data requested in the read operation; and retrieving the data from the one or more locations based on an efficiency of accessing the data at the one or more locations.

3. The computer-implemented method of claim 2, wherein the data is retrieved from at least one of the portable storage device, a log comprising one or more write operations, and a cache on the host computer system.

4. The computer-implemented method of claim 1, wherein processing the write operation further involves:

committing the write operation by updating the mapping.

5. The computer-implemented method of claim 4, wherein processing the write operation further involves at least one of:

periodically compacting a set of blocks in the portable storage device;

compressing the blocks;

encrypting the blocks; and generating one or more authentication codes associated with the blocks.

6. The computer-implemented method of claim 5, wherein periodically compacting the blocks involves:

consolidating and reordering partially freed blocks from the blocks in the portable storage device; and updating the mapping based on the consolidated blocks.

7. The computer-implemented method of claim 1, wherein the I/O operation is intercepted by a program stored on the portable storage device.

8. A system for processing an input/output (I/O) operation, comprising:

a hypervisor configured to load a virtual computing environment stored on a portable storage device into a host computer system coupled to the portable storage device, wherein the host computer system includes a physical memory;

the hypervisor further configured to maintain a mapping of logical memory locations in the virtual computing environment to memory locations in the portable storage device;

an interceptor configured to intercept an invocation of the I/O operation from the virtual computing environment in the host computer system to the portable storage device, wherein the I/O operation is one of a read operation or a write operation, wherein the interceptor is configured to process a write operation by:

storing the write operation in a log that stores write operations that are yet to be processed, and returning control to the virtual computing environment upon storing the write operation in the log;

a log processor configured to decouple the invocation of the I/O operation from the processing of the I/O operation, wherein the decoupling comprises providing a representation of the I/O operation to the virtual computing environment, wherein the log processor is configured to execute a write operation by transferring data specified by the write operation from the log to the portable storage device; and the log processor further configured to process the I/O operation in the portable storage device independently of the representation of the I/O operation to the virtual computing environment in the host computer system using the mapping.

9. The system of claim 8, wherein the interceptor is configured to process the read operation by:

determining one or more locations storing data requested in the read operation; and retrieving the data from the one or more locations based on an efficiency of accessing the data at the one or more locations.

10. The system of claim 9, wherein the data is retrieved from at least one of the portable storage device, a log comprising one or more write operations, and a cache on the host computer system.

11. The system of claim 8, wherein the log processor is further configured to process the write operation by:

committing the write operation by updating the mapping.

12. The system of claim 11, wherein processing the write operation further involves at least one of:

periodically compacting a set of blocks in the portable storage device;

compressing the blocks;

encrypting the blocks; and generating one or more authentication codes associated with the blocks.

13. The system of claim 8, wherein the interceptor is stored on the portable storage device.

14. A non-transitory computer-readable storage medium storing instructions that when executed by a computer cause the computer to perform a method for processing an input/output (I/O) operation, the method comprising:

loading a virtual computing environment stored on a portable storage device into a host computer system coupled to the portable storage device, wherein the host computer system includes a physical memory;

maintaining a mapping of logical memory locations in the virtual computing environment to memory locations in the portable storage device;

intercepting an invocation of the I/O operation from the virtual computing environment in the host computer system to the portable storage device, wherein the I/O operation is one of a read operation or a write operation, and wherein intercepting a write operation involves processing the write operation by:

storing the write operation in a log that stores write operations that are yet to be processed, and returning control to the virtual computing environment upon storing the write operation in the log;

decoupling the invocation of the I/O operation the processing of the I/O operation, wherein the decoupling comprises providing a representation of the I/O operation to the virtual computing environment, wherein processing a write operation involves transferring data specified by the write operation from the log to the portable storage device; and processing the I/O operation in the portable storage device independently of the representation of the I/O operation to the virtual computing environment in the host computer system using the mapping.

15. The computer-readable storage medium of claim 14, wherein processing a read operation corresponding to the I/O operation involves:

determining one or more locations storing data requested in the read operation; and retrieving the data from the one or more locations based on an efficiency of accessing the data at the one or more locations.

* * * * *